(12) United States Patent
Tiemann et al.

(10) Patent No.: US 10,717,064 B2
(45) Date of Patent: Jul. 21, 2020

(54) EVAPORATOR

(71) Applicant: DIEHL AEROSPACE GMBH, Ueberlingen (DE)

(72) Inventors: David Tiemann, Gau-Odernheim (DE); Karl-Peter Schelhaas, Schornsheim (DE)

(73) Assignee: DIEHL AEROSPACE GMBH, Ueberlingen (DE)

(*) Notice: Subject to any disclaimer, the term of this patent is extended or adjusted under 35 U.S.C. 154(b) by 104 days.

(21) Appl. No.: 15/899,665

(22) Filed: Feb. 20, 2018

(65) Prior Publication Data

US 2018/0236430 A1  Aug. 23, 2018

(30) Foreign Application Priority Data

Feb. 20, 2017 (DE) .......... 10 2017 001 565

(51) Int. Cl.
*B01J 19/24* (2006.01)
*F28D 9/00* (2006.01)
(Continued)

(52) U.S. Cl.
CPC ............. *B01J 19/249* (2013.01); *B01B 1/005* (2013.01); *B01D 1/221* (2013.01); *B01D 1/30* (2013.01);
(Continued)

(58) Field of Classification Search
CPC .. F28D 9/00; F28D 9/0037; F28D 2021/0064; F28F 3/04; F28F 3/048;
(Continued)

(56) References Cited

U.S. PATENT DOCUMENTS 7,442,360 B2  10/2008  Tonkovich et al.
2002/0041839 A1  4/2002  Cwik et al.
(Continued)

FOREIGN PATENT DOCUMENTS

DE  10039592 A1  5/2002
DE  60302438 T2  8/2006
EP  0906890 A1  4/1999

OTHER PUBLICATIONS

Kolb, Gunther et al., "Energy systems for a greener future", Green Process Synth (2014), vol. 3, pp. 81-84.
(Continued)

*Primary Examiner* — Elizabeth J Martin
(74) *Attorney, Agent, or Firm* — Scully Scott Murphy and Presser

(57) ABSTRACT

An evaporator comprising an evaporator body (3) surrounded by an evaporator housing (5), wherein the evaporator housing (5) is provided with a feed line (1) for feeding a liquid into the evaporator housing (5) and with an outlet (6) for emitting any vapour produced,
wherein the evaporator body (3) comprises a multiplicity of plates (7) which are arranged in a planar manner one above another, wherein a void (8) is formed in each case between adjacent plates (7), wherein each of the voids (8) is fluidically connected to the outlet,
wherein a liquid distributor is interconnected between the feed line (1) and the evaporator body (3), wherein the liquid distributor branches off from the feed line (1) in the direction of the evaporator body (3) in at least two distributor lines (VR), and
wherein each distributor line (VR) is connected to at least one void (8).

13 Claims, 3 Drawing Sheets

Figure 2:
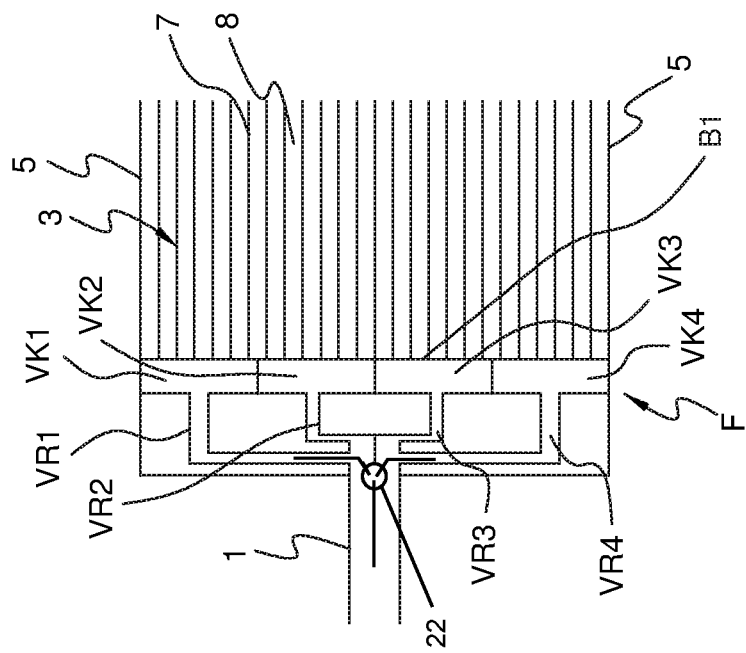

(51) Int. Cl.
    *F28F 9/02*         (2006.01)
    *B01B 1/00*        (2006.01)
    *B01D 1/22*        (2006.01)
    *B01D 1/30*        (2006.01)
    *F28D 21/00*      (2006.01)

(52) U.S. Cl.
    CPC .......... *F28D 9/0037* (2013.01); *F28F 9/0278* (2013.01); *B01J 2219/00051* (2013.01); *B01J 2219/00804* (2013.01); *B01J 2219/00889* (2013.01); *B01J 2219/247* (2013.01); *F28D 2021/0071* (2013.01)

(58) Field of Classification Search
    CPC ......... F28F 13/08; F28F 9/0278; F22G 11/00; H01M 8/0612
    See application file for complete search history.

(56) References Cited

U.S. PATENT DOCUMENTS

2003/0152488 A1    8/2003    Tonkovich et al.
2010/0258198 A1*  10/2010   Tonkovich ........... B01J 19/0093
                                                                137/14

OTHER PUBLICATIONS

O'Connell, M., "A Review of Current Microchannel Based Fuel Processing Systems With a Focus on the Prime Development Issues for Early Market Implementation", 4th World Hydrogen Technologies Convention, 2011, Glasgow, U.K.

\* cited by examiner

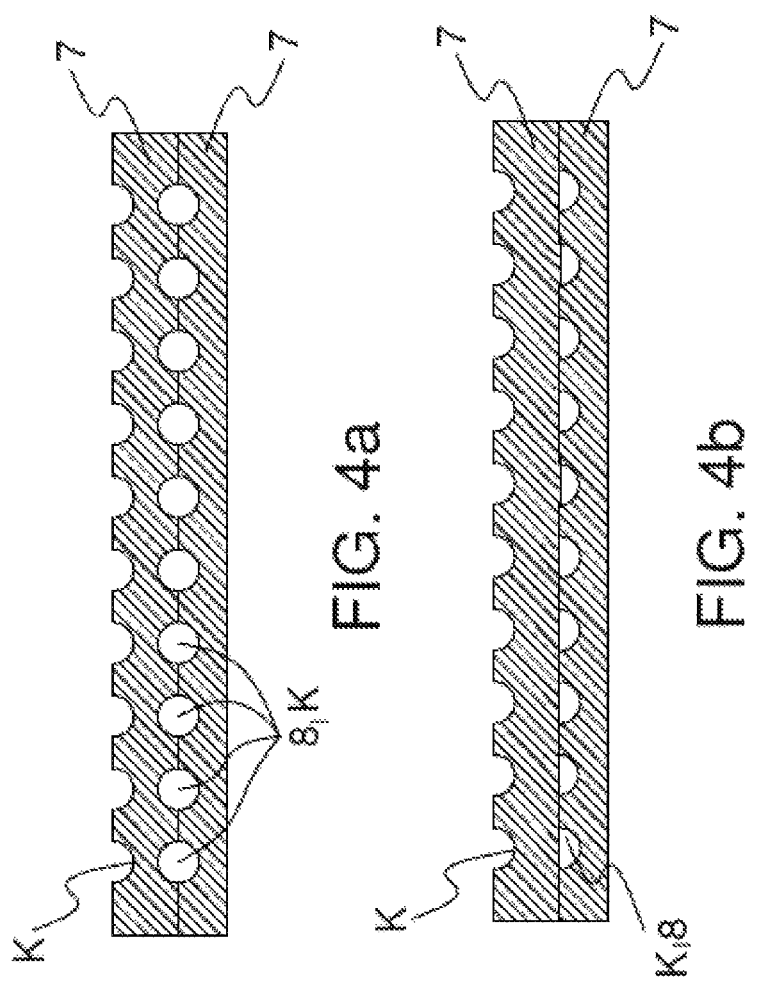

EVAPORATOR

The invention relates to an evaporator having a liquid distributor.

An evaporator having a liquid distributor is known for example from G. Kolb et al. Green Process Synth., 2014, 3: 81-84. The known liquid distributor is designed for an evaporator, wherein the evaporator comprises a multiplicity of plates which are arranged in a planar manner one above another, wherein a void is formed in each case between adjacent plates. The known distributor comprises a feed line for feeding a liquid, and a cavity fluidically connected to the feed line, wherein the cavity is connected to a multiplicity of the voids.

A further evaporator having a liquid distributor is known from M. O'Connel et al., $4^{th}$ World Hydrogen Technologies Convention, 2011, Glasgow, U.K. The known evaporator is used in particular to evaporate fuels such as methanol, ethanol, LPG or diesel. In that case, the fuel is fed through the feed line. Formed at the end of the feed line is a cavity. This cavity has a larger cross section than the feed line, in order to distribute the liquid to all the plates of the evaporator. The individual plates of the distributor exhibit microstructuring for example in the form of flutes.

A drawback of the known liquid distributors is that the individual plates are charged non-uniformly with the liquid, in particular the fuel. As a result, the capacity of the evaporator cannot be used to the full. In particular, too small a proportion of the liquid is converted into the vapour phase. The non-uniform charging causes non-uniform evaporation and results in a non-uniform temperature distribution in the evaporator. It is thus harder to regulate the temperature in the evaporator, and so an exit temperature of the gas from the evaporator is in particular too high.

DE 100 39 592 A1 discloses a device for feeding starting materials to parallel, mutually separated spaces by way of a distributor unit, wherein exit means of the distributor unit are assigned to the spaces, and wherein evaporator structures for evaporating liquid media are provided in the spaces, wherein in each case one exit means of the distributor unit projects into a space and the boiling point of the medium in the distributor unit is above the temperature of the medium in the distributor unit.

The object of the invention is to remedy the drawbacks according to the prior art. In particular, the intention is to specify a distributor structure which allows a uniform liquid pressure over the height of an evaporator.

The object of the invention is achieved by the features of claim 1. Expedient configurations of the invention can be gathered from the features of claims 2 to 10.

According to the invention, an evaporator comprising an evaporator body surrounded by an evaporator housing is proposed, wherein the evaporator housing is provided with a feed line for feeding a liquid into the evaporator housing and with an outlet for emitting any vapour produced. The evaporator body comprises a multiplicity of plates which are arranged in a planar manner one above another, wherein at least one void is formed in each case between adjacent plates, wherein each of the voids is fluidically connected to the outlet. A liquid distributor is interconnected between the feed line and the evaporator body, wherein the liquid distributor branches off from the feed line in the direction of the evaporator body in at least two distributor lines, and wherein each distributor line is connected to at least one void.

As a result of the move away from a single, large-volume cavity, it is possible, through the use of the proposed liquid distributor, to now feed the liquid in a targeted manner to sections of the evaporator body. In particular, the liquid can be fed in a targeted manner for example to an upper part of the plates and to a lower part of the plates. The evaporator with the plates arranged in parallel one above another can be operated in a horizontal orientation or in some other orientation, for example an inclined orientation or even a vertical orientation. More generally, the evaporator can be operated in any desired orientation with respect to the force of gravity or the sum of the forces.

In this case, a cross-sectional area of the feed line corresponds substantially to the sum of the cross-sectional areas of the distributor lines. As a result, changes to the flow rate of the liquid are reduced.

A pressure loss between an end, facing the evaporator body, of the feed line and an end, facing the evaporator body, of each distributor line is advantageously substantially the same. As a result, the liquid can be fed from each distributor line to the void(s) with substantially the same pressure. More uniform charging of the evaporator body can consequently be achieved.

An equal pressure loss within the distributor lines is achieved by an equal volume of each particular supply line. Expediently, the distributor lines are substantially the same length and have the same cross section. As a result of an equal pressure loss, the liquid is fed to the voids in the evaporator body at substantially the same rate.

Advantageously, a pre-distributor structure 22 is connected between the feed line and the distributor lines, the feed line branching in a tree-like manner into a multiplicity of feed end lines in said pre-distributor structure, wherein each of the feed end lines branches into at least two distributor lines. Multiple branching of the feed lines is advantageous in particular in very large evaporators, such that a uniform liquid distribution is ensured at each branch.

In a further configuration, each distributor line leads into a cavity, wherein the cavity is connected to a multiplicity of the voids. The cavity has a larger cross section than the distributor line connected thereto. Expediently, there are n cavities, wherein n is a natural number, wherein each of the cavities is connected to in each case about $1/n$ of the total number of voids. If for example n=4, each cavity is connected to ¼ of the voids.

In a further configuration, the distributor lines extend in a plane perpendicular to the feed line and lead into the cavities perpendicularly to the extension direction. The extension of the distributor lines in a perpendicular plane makes it possible to adapt the length of the distributor lines leading in each case to the cavities such that in each case the same pressure loss occurs therein. Furthermore, as a result of the configuration, the size of the liquid distributor can be reduced.

The plates can be provided with flow guiding elements. Such flow guiding elements can be for example patterns introduced into the plates by microstructuring of the surface. In order to produce the microstructuring, known additive or subtractive methods, for example deposition or etching, or alternatively forming methods, such as stamping or rolling, can be used. Expediently, all the plates have identical microstructuring. This can be channels, fishbone patterns or the like. The microstructuring of the plates can be introduced on one or both sides of a plate.

In a further configuration, channels are formed integrally in the plates, wherein adjacent plates butt against one another directly in regions between the channels such that a multiplicity of voids are formed between two adjacent plates, said voids being fluidically connected to the feed line and the outlet. As a result of the provision of the channels, a contact area between the liquid and the plates is enlarged. As a result, the liquid, or the vapour produced, can be brought quickly and with little deviation to a desired temperature and held there. The channels can be in particular parallel channels which extend along the plates.

Expediently, an aperture plate is arranged between the cavities and the voids. Such an aperture plate serves additionally for uniform liquid distribution. The aperture plate has in particular openings which are adapted to the voids, in particular channels, between the plates.

In one use example, the liquid distributor is used for the evaporation of a propylene glycol/water mixture for microstructured reformers in a fuel cell system. In order to produce hydrogen from a propylene glycol/water mixture, the propylene glycol first of all has to be converted into the vapour phase. In order to increase the efficiency of the fuel cell system, it is expedient for all of the propylene glycol/water mixture to be converted into the vapour phase and to be provided at a defined temperature in the subsequent reactor. The propylene glycol/water mixture is fed via the feed line. In the liquid distributor according to the invention, the propylene glycol/water mixture is distributed to the different distributor lines such that the propylene glycol/water mixture is fed to each cavity with the same pressure. Each of the cavities distributes the propylene glycol/water mixture further to the voids, connected thereto, in the evaporator body. Expediently, the evaporator is a plate evaporator with microstructured plates, such that the liquid is fed to a multiplicity of further lines or flutes on each of the plates at a constant pressure. The plates are in particular all structured identically and are at identical spacings from one another. As a result, all the voids are charged uniformly with the propylene glycol/water mixture and allow uniform evaporation of the propylene glycol/water mixture. A planar evaporation front is substantially formed. In this way, it is comparatively easy to regulate the temperature of the evaporator and thus the temperature of the propylene glycol/water mixture converted into the gas phase. The gas produced in this way can be introduced into the subsequent reactor.

Figure 1:
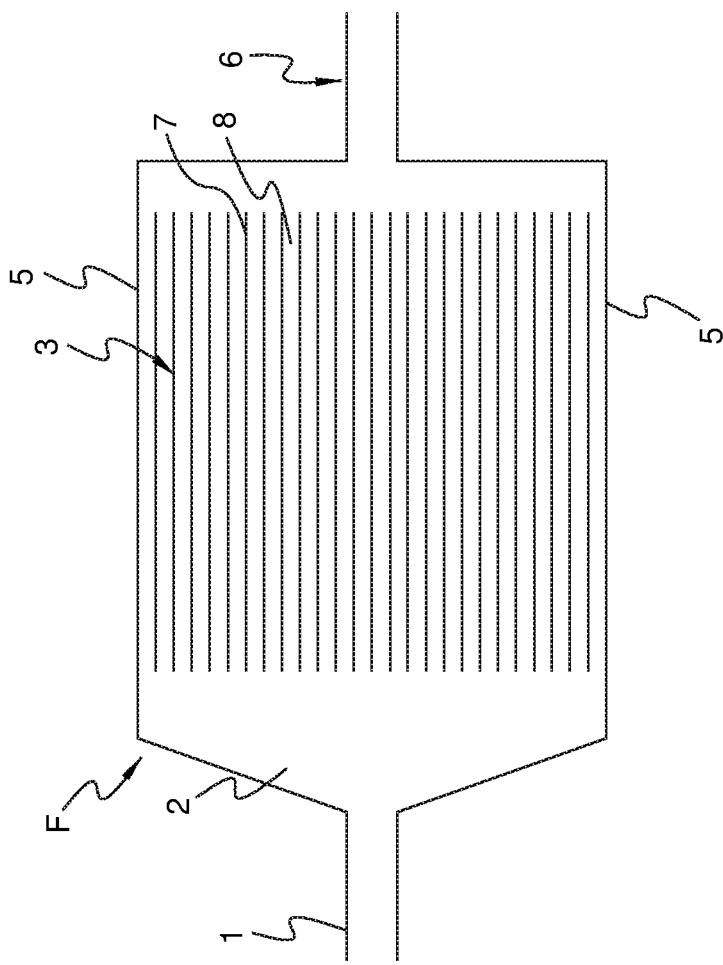
Figure 3:
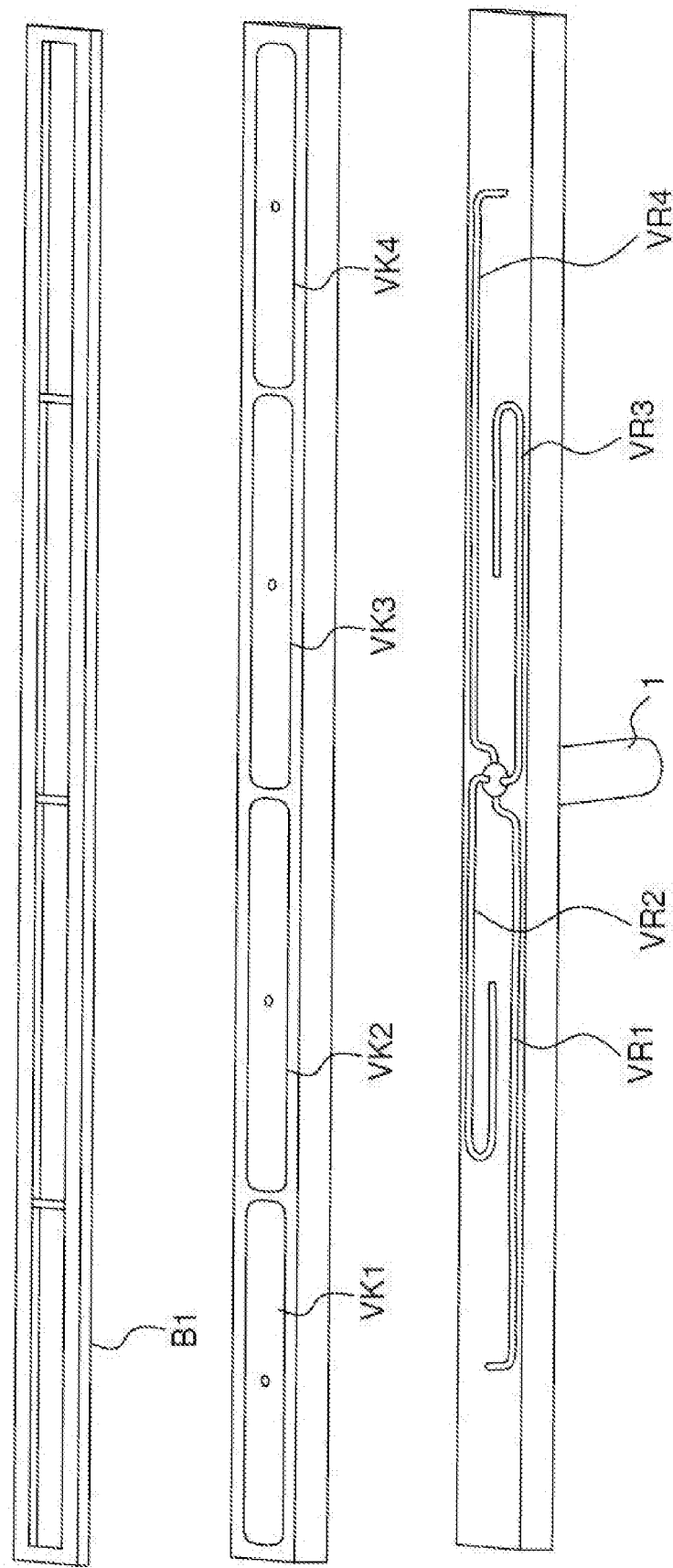

The invention will be demonstrated in the following text by way of illustrations, in which:

FIG. 1 shows an extensive liquid distributor having a plate evaporator according to the prior art, FIG. 2 shows a liquid distributor for an evaporator according to the invention, FIG. 3 shows an exploded view of a liquid distributor, FIG. 4a shows a cross section through plates in the evaporator body, and FIG. 4b shows a further configuration of a cross section through plates in the evaporator body.

FIG. 1 shows a large-volume liquid distributor F for a plate evaporator having an evaporation housing 5 and an outlet 6 according to the prior art. The feed line 1 widens into the large-volume cavity 2 as a liquid distributor F. The large-volume cavity 2 is connected to the evaporator body 3, which has a multiplicity of plates 7 arranged in a planar manner one above another. Each of the plates 7 typically has a microstructure, for example in the form of channels which extend from the large-volume cavity 2 to an outlet of the evaporator. In order to operate the evaporator according to the prior art, it is necessary for the large-volume cavity 2 to be completely filled with liquid in order to prevent individual voids 8 in the evaporator from running dry. With the known distributor, it is not possible to regulate a liquid pressure in the single transition between the cavity and the voids.

FIG. 2 shows a liquid distributor according to the invention. The liquid is introduced via the feed line 1. The feed line 1 splits up into four distributor lines in this exemplary embodiment. The distributor lines are denoted VR1 for the first distributor line to VR4 for the fourth distributor line. Each of the distributor lines VR1 to VR4 is connected to a cavity VK1 to VK4, respectively. The cavities VK1 to VK4 are arranged one above another, such that each of the cavities VK1 to VK4 is connected to a particular part of the voids 8 between the plates 7 of the evaporator body 3. Expediently, a supply line, which consists for example of the feed line 1, of the first distributor line VR1 and of the first cavity VK1, exhibits an identical pressure loss. An identical pressure loss is achieved by substantially equal lengths and cross sections of the distributor lines VR1 to VR4 and by an identical volume of the cavities VK1 to VK4. The introduction of the aperture plate B1 between the cavities VK1 to VK4 and the evaporator body 3 serves to adapt the cross section of the cavities VK to the inlets of the voids 8 between the plates 7, in particular of the channels K. It is also possible for feed end lines to be connected between the distributor lines VR and the cavities VK (this not being shown).

FIG. 3 shows an exploded view of a liquid distributor. The feed line 1 splits up into four distributor lines VR in the exemplary embodiment depicted. The first distributor line VR1 and fourth distributor line VR4 each lead to the external first cavity VK1 and fourth cavity VK4. The second distributor line VR2 and third distributor line VR3 extend in the same plane. However, the second distributor line VR2 and third distributor line VR3 are configured such that they lead to the internal second cavity VK2 and third cavity VK3. As a result of the curved embodiment of the second distributor line VR2 and third distributor line VR3, an identical length to the first distributor line VR1 and fourth distributor line VR4 can be achieved. Each of the distributor lines VR1 to VR4 leads into the cavities VK1 to VK4 perpendicularly to the extension direction of the distributor lines VR1 to VR4. The cavities VK1 to VK4 have an identical shape and size. Arranged above each of the cavities VK1 to VK4 is an aperture plate B1, which has a rectangular aperture for each cavity VK1 to VK4.

Such a liquid distributor is arranged such that, for example, the first cavity VK1 is connected to a first lower part of the plates 7 and the voids 8 located therebetween. A second cavity VK2 is connected to the next plate-stack region, a third cavity VK3 is connected to the subsequent plate-stack region located thereabove, and finally the fourth cavity VK4 is connected to the topmost plate-stack region of the evaporator body 3. Although the division into four cavities VK1 to VK4 is shown in this exemplary embodiment, a smaller or larger number of cavities VK and the associated supply lines and feed end lines connected optionally therebetween is possible, depending on the height of the evaporator and the number of plates 7 associated therewith.

FIG. 4a shows a cross section through the plates 7 in the evaporator body. What is shown is a detail from two plates 7. The plates 7 have microstructuring in the form of flutes. These flutes can, as in the case shown, be introduced into the top side and underside of the plates and form channels K. The raised regions of the plates 7 butt against one another such that the voids 8 are formed by the flutes. Although only two plates 7 are shown by way of example in this cross section, a multiplicity of identically structured plates 7 are arranged in an evaporator body. FIG. 4b shows an alternative configuration in which only one side of the plates 7 has microstructuring in the form of flutes and forms channels K.

LIST OF REFERENCE SIGNS

1 Feed line
2 Large-volume cavity
3 Evaporator body
5 Evaporator housing
6 Outlet
7 Plate
8 Void
B1 Aperture plate
F Liquid distributor
K Channel
VK Cavity
VK1 First cavity
VK2 Second cavity
VK3 Third cavity
VK4 Fourth cavity
VR Distributor line
VR1 First distributor line
VR2 Second distributor line
VR3 Third distributor line
VR4 Fourth distributor line

The invention claimed is:

1. An evaporator comprising an evaporator body surrounded by an evaporator housing, wherein the evaporator housing is provided with a feed line for feeding a liquid into the evaporator housing and then into the evaporator with an outlet for emitting any vapour produced,
wherein the evaporator body comprises a multiplicity of closed plates which are arranged in a planar manner one above another, wherein at least one separate void is formed in each case between adjacent closed plates, wherein each of the separate voids is fluidically connected to the outlet,
wherein a liquid distributor is interconnected between the feed line and the evaporator body, wherein the liquid distributor branches off from the feed line in the direction of the evaporator body in at least two distributor lines (VR), and
wherein each distributor line (VR) is connected to at least one separate void,
wherein a cross-sectional area of the feed line corresponds substantially to the sum of the cross-sectional areas of the distributor lines (VR).

2. The evaporator according to claim 1, wherein a pressure loss between an end, facing the evaporator body, of the feed line and an end, facing the evaporator body, of each distributor line (VR) is substantially the same.

3. The evaporator according to claim 1, wherein the distributor lines (VR) are substantially the same length and have the same cross section.

4. The evaporator according to claim 1, wherein a pre-distributor structure is connected between the feed line and the distributor lines (VR), the feed line splitting up in a tree-like manner into a multiplicity of feed end lines in said pre-distributor structure, wherein each of the feed end lines is divided into at least two distributor lines (VR).

5. The evaporator according to claim 1, wherein each distributor line (VR) leads into a cavity (VK), wherein the cavity (VK) is connected to a multiplicity of the voids.

6. The evaporator according to claim 5, wherein the distributor lines (VR) extend in a plane perpendicular to the feed line and lead into the cavities (VK) perpendicularly to the extension direction.

7. The evaporator according to claim 6, wherein an aperture plate (B1) is arranged between the cavities (VK) and the channels (K).

8. The evaporator according to claim 5, wherein an aperture plate (B1) is arranged between the cavities (VK) and the channels (K).

9. The evaporator according to claim 1, wherein the closed plates are provided with flow guiding elements.

10. The evaporator according to claim 1, wherein channels (K) are formed integrally on the closed plates, wherein adjacent closed plates butt against one another directly in regions between the channels (K) such that a multiplicity of separate voids are formed between two adjacent closed plates, said voids being fluidically connected to the feed line and the outlet (A).

11. The evaporator according to claim 10, wherein the channels (K) extend in parallel.

12. The evaporator according to claim 11, wherein an aperture plate (B1) is arranged between the cavities (VK) and the channels (K).

13. The evaporator according to claim 10, wherein an aperture plate (B1) is arranged between the cavities (VK) and the channels (K).

* * * * *